Aug. 25, 1942.   G. A. HINDS ET AL   2,294,086
PNEUMATIC SEPARATING APPARATUS
Filed July 5, 1939   2 Sheets-Sheet 1
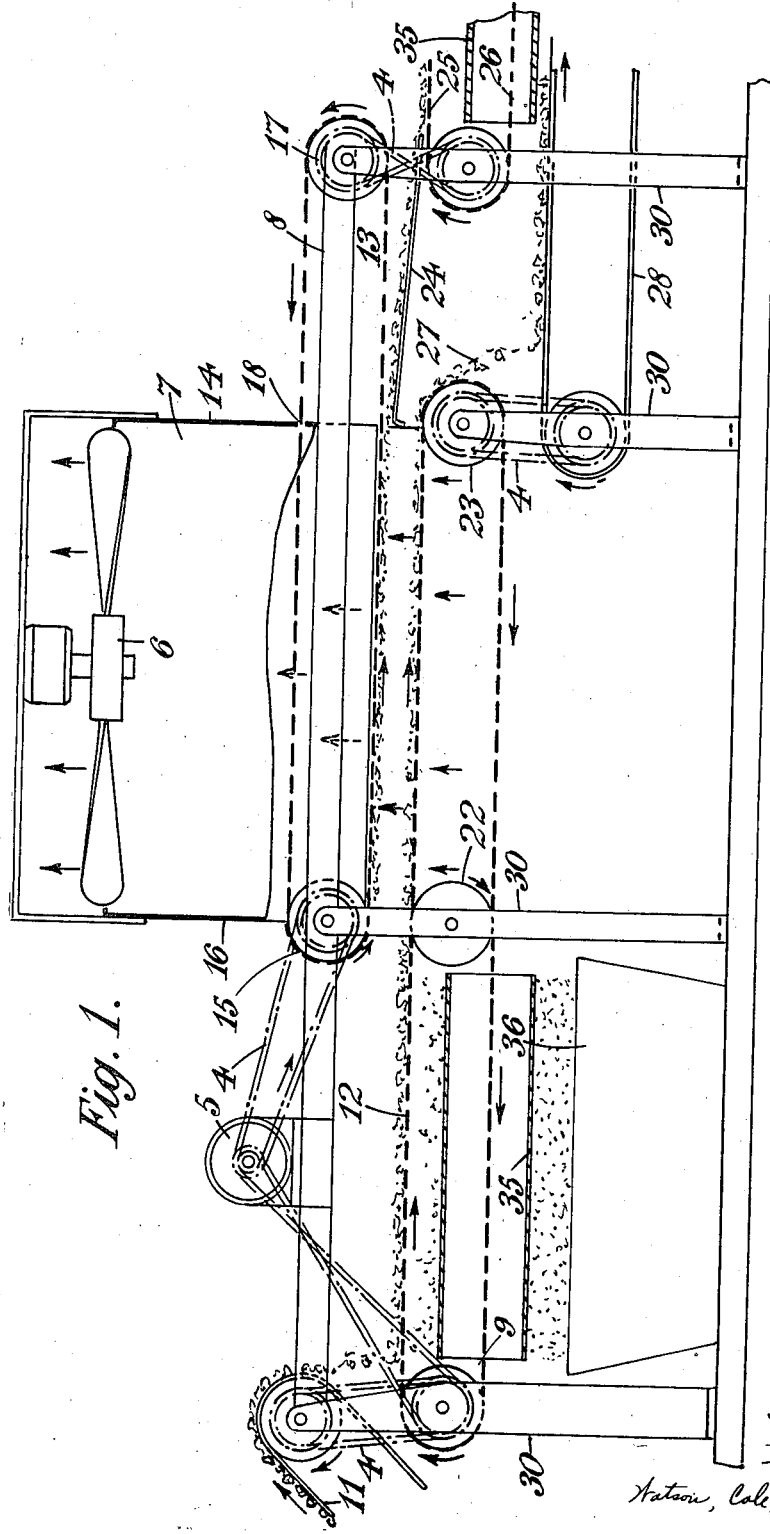

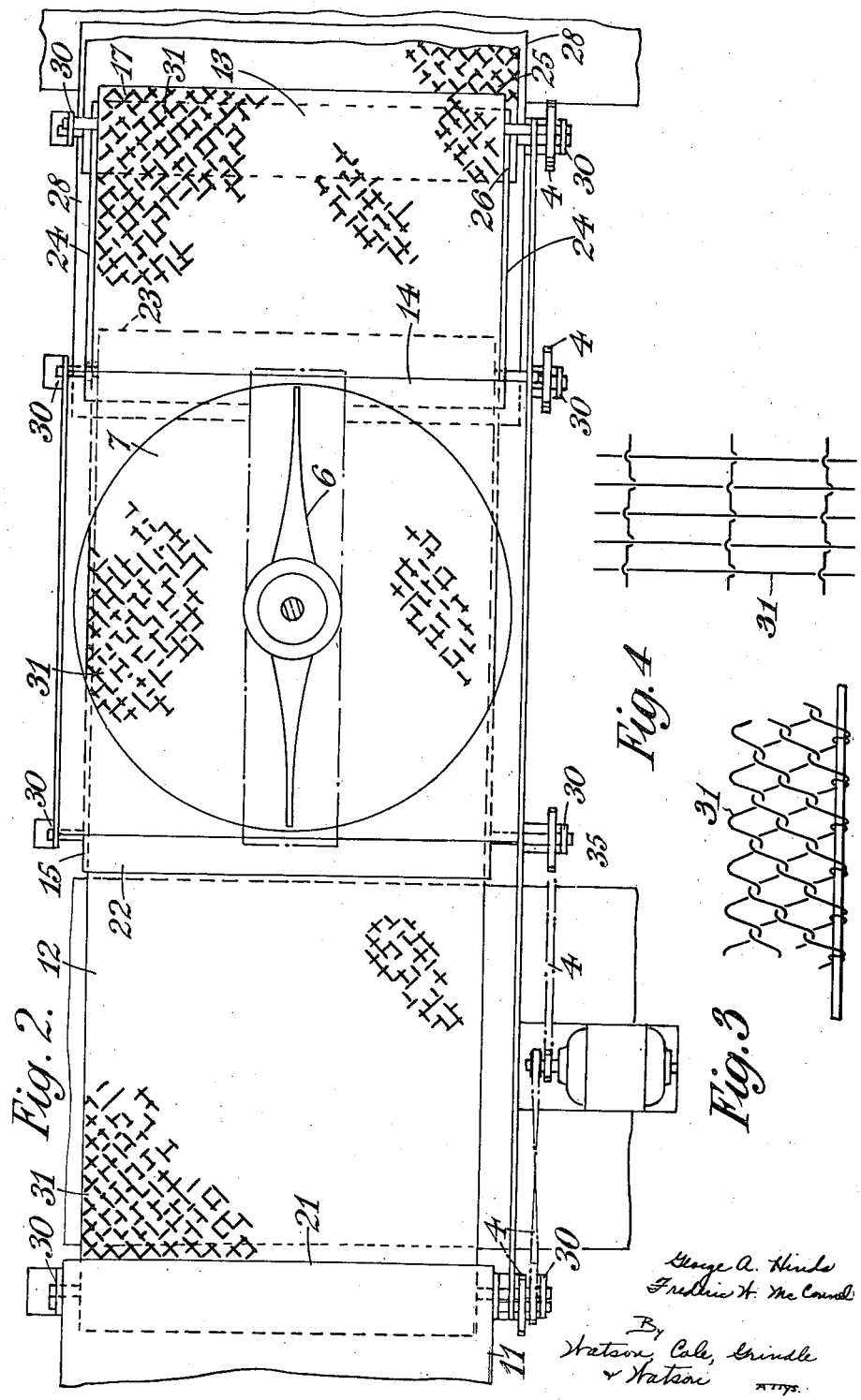

Patented Aug. 25, 1942

2,294,086

UNITED STATES PATENT OFFICE 2,294,086

PNEUMATIC SEPARATING APPARATUS

George Arthur Hinds and Frederic Whigham McConnel, Martley, England, assignors to McConnel Hinds Limited, Martley, Worcestershire, England, a British company Application July 5, 1939, Serial No. 282,922
In Great Britain July 8, 1938

7 Claims. (Cl. 209—44)

This invention is for improvements in or relating to pneumatic separating apparatus of the kind in which an air current is arranged to have a selective action on the constituents of a mixture to be separated and has for its object to provide an apparatus suitable for separating hop leaves from hop flowers.

According to this invention, a pneumatic separating apparatus of the kind referred to above comprises two grids spaced apart and arranged one above the other, means for introducing the mixture between the grids, means for effecting an upward air current through the two grids at such a velocity as to lift one or more of the constituents from the mixture and hold it against the upper grid and means for separately collecting the separated constituents from the two grids.

Either or both of said grids may be arranged to travel into and out of the zone of the air current; for example, either or each of the grids may comprise a perforated belt conveyor.

In the case in which two perforated belt conveyors are employed, the lower stretch of the upper belt conveyor is arranged immediately above the upper stretch of the lower belt conveyor. Preferably, these two stretches are arranged to travel in the same direction.

The means for effecting an upward air current may comprise a suction chest arranged above the upper grid, which latter forms the bottom wall of said chest.

In such an arrangement, the lower grid also comprises a belt conveyor which is arranged to extend beyond a side wall of the vacuum chest at that end thereof on to which the mixture is loaded.

The loading may be effected by another belt conveyor.

The delivery ends of the two conveyors may terminate at different locations in relation to the air current, so that the constituents may be separately collected. For example, the delivery end of the upper conveyor may be arranged to extend beyond a side wall of the vacuum chest and beyond the delivery end of the lower conveyor.

The mixture which is fed to the separator may contain flower petals and seeds which may have become detached from the flowers by previous operations. It will be appreciated that with the above apparatus the petals and seeds will be liable to become mixed with the leaves and thus lost. To overcome this objection the mixture of hops and hop leaves may be passed over a sieve before they reach the air current which sieve is of a character to permit the petals and seeds to pass through it and means may be provided for collecting the petals and seeds and mixing them with the hop flowers after the latter have been separated by the air current. The aforesaid lower conveyor may comprise the necessary sieve. Alternatively, the hop leaves mixed with petals and seeds which result from subjecting the original mixture to the air current may be passed over a sieve through which the petals and seeds pass and are collected for subsequent mixture with the separated hop flowers. For example, in the arrangements referred to above, a conveyor in the form of a sieve may be arranged to receive the hop leaves, petals and seeds which fall as a result of no longer being under the influence of the air current.

The following is a description of a form of pneumatic separator suitable for separating hop leaves from hop flowers, reference being made to the accompanying diagrammatic drawings, in which—

Figure 1 is a vertical section through one form of apparatus,

Figure 2 is a section on the line 2—2 of Figure 1,

Figure 3 shows a portion of one form of wire mesh employed for a grid, and

Figure 4 shows another form of wire mesh suitable for a grid.

Like reference numerals refer to like parts in the various figures of the drawings.

Referring to the construction shown in Figures 1 and 2, the mixture 10 of hops and petals is fed by an inclined belt conveyor 11 on to the upper stretch 12 of a horizontally disposed belt conveyor 9, the belt of which is formed from wire mesh, as shown in either Figure 5 or Figure 6. Disposed about 4 inches above the upper stretch 12 of the conveyor 9 is the lower stretch 13 of a similar belt conveyor 8. The wire mesh of the conveyor 9 is of a character that will support the hop flowers and leaves but will permit the passage of detached flower petals and seeds. The petals and seeds fall on to the upper stretch of a transversely arranged conveyor 35 which passes between the upper and lower stretches of the conveyor 9 and this transverse conveyor delivers the petals and seeds to a collecting bin 36 arranged at the delivery end thereof. The collected seeds and petals are subsequently mixed with the separated hop flowers. The conveyor 8 constitutes the lower wall of a vacuum chest 7 having a motor-driven fan 6 mounted at the top thereof. The two conveyors are driven from an electric motor 5 and belting 4 so that the lower stretch 13 of the upper conveyor 8 moves in the same direction as the upper stretch 12 of the lower conveyor 9. The upper conveyor 8 encircles at the supply end a solid roller 15 arranged in close proximity to the lower edge of the side wall 16 of the suction chest which roller, therefore, forms an air seal between the upper and lower stretches of the conveyor at that side of the vacuum chest where the mixture enters. The other end of the conveyor encircles a roller 17 which is disposed outside and beyond the other side wall of the vacuum chest. The upper stretch of the conveyor passes through a suitable slot 18 in the side wall, whereas the lower stretch is arranged to pass in close proximity to the lower edge of that side wall. When the mixture of hops and leaves is traversed beneath the suction chest the leaves are drawn upwardly by the current of air induced by the fan and stick to the underside of the lower stretch 13 of the upper conveyor. The lower conveyor is supported by three rollers 21, 22, and 23. The roller 21 is disposed outside and at some distance from the side wall 16 of the vacuum chest, so as to provide sufficient space for the loading of the mixture. The roller 22 is arranged immediately beneath the roller 15 and the roller 23 is arranged in line with the side wall 14. Immediately beneath that part of the lower stretch 13 of the upper conveyor which extends beyond the side wall 14 of the vacuum chest, is an inclined chute 24 which is arranged to collect the leaves which fall from the stretch 13 as it passes away from the influence of the chest and delivers the separated leaves on to a belt conveyor 25 which conveys them to a suitable receptacle (not shown). This conveyor may also be formed from an open wire mesh so as to allow any detached petals or seeds which may have become mixed with the leaves to pass through it, which petals and seeds may be collected by a transverse conveyor 35 similar to that described in connection with the conveyor 9. The roller 26 of this latter conveyor is disposed to one side of the roller 23 of the aforesaid lower conveyor, thus providing a gap through which the hop flowers 27 can fall from the end of the upper stretch 12 of the lower conveyor 9 on to yet a further conveyor 28 which delivers them to a suitable receptacle. The various rollers and vacuum chest are supported on a suitable framework 30. The endless belts of the upper and lower conveyors may be formed from wire fabric comprising wires interwoven to provide diamond-shaped openings 31, as shown in Figure 5, the width across parallel sides of the diamonds being about one-half of an inch. Alternatively, the wire mesh may comprise wires interwoven in the manner shown in Figure 6 so as to provide rectangular spaces of which the smaller dimension is from three-eighths of an inch to one-half of an inch.

The fan is arranged to provide an up-draught having a velocity of about 600 ft. per minute.

We claim:

1. A pneumatic separating apparatus comprising a suction chest, two horizontally disposed perforated belt conveyors arranged one above the other with both stretches of both belts beneath said suction chest and with the upper belt extending beyond a side wall of the suction chest, means for introducing the mixture to be separated between the upper stretch of the lower belt and the lower stretch of the upper belt at the inlet end thereof, means for continuously traversing both belts beneath the suction chest so as to be subjected to the suction thereof said upper belt being adapted to hold the lighter particles of the mixture which are sucked against it until the belt passes outside the influence of the chest.

2. A pneumatic separating apparatus comprising a suction chest, two horizontally disposed perforated belt conveyors arranged one above the other with both stretches of both belts beneath said suction chest and with the delivery ends of both belts extending beyond a side of the suction chest, the upper belt to a greater extent than the lower belt, means for separating the projecting ends of said belts, means for introducing the mixture to be separated between the upper stretch of the lower belt and the lower stretch of the upper belt at the opposite ends to the projecting ends and means for continuously traversing both belts beneath the suction chest so as to be subjected to the suction thereof said upper belt being adapted to hold the lighter particles of the mixture.

3. A pneumatic separating apparatus comprising a suction chest, two horizontally disposed perforated belt conveyors arranged one above the other with both stretches of both belts beneath said suction chest and with the upper belt extending beyond the side wall of the suction chest and the lower belt extending beyond an opposite wall of said suction chest, means for continuously traversing both belts beneath the suction chest so that the lower stretch of the upper belt and the upper stretch of the lower belt move in the same direction and are subjected to the suction of the chest, a conveyor adapted to load the mixture to be separated on to the projecting inlet end of the lower conveyor, a chute arranged to separate the delivery ends of the two conveyors and a delivery conveyor associated with said delivery chute.

4. A pneumatic separating apparatus for separating hop leaves from hop flowers comprising a suction chest adapted to effect an upward air current of about 600 feet per minute, two horizontally disposed belt conveyors, the belts of which are formed from open wire mesh adapted to support both the leaves and hop flowers, which conveyors are arranged one above the other with both reaches of each beneath the suction chest so that the delivery end of the upper belt extends beyond one side of the suction chest and the inlet end of the lower belt extends beyond an opposite side of the suction chest, means for continuously traversing said belts beneath the suction chest so that the delivery end of the upper belt extends beyond one side of the suction chest and the inlet end of the lower belt extends beyond an opposite side of the suction chest, and the lower stretch of the upper belt and the upper stretch of the lower belt move in the same direction while both are subjected to the suction of the chest, a conveyor for loading the mixture to be separated on to the projecting end of the lower belt and above the upper stretch of the lower belt, a chute disposed beneath the projecting end of the upper belt and a delivery conveyor associated with said chute.

5. A pneumatic separating apparatus for separating hop flowers, hop petals and seeds from a mixture of these ingredients with hop leaves, which comprises means for feeding the mixture on to a sieve, said sieve having openings of such size as to permit the passage through it of the petals and seeds and having portions which support the hop flowers and hop leaves, means to receive said petals and seeds a suction chest, two grids spaced apart, one above the other with the lower one including said sieve, beneath said chest, means for feeding the retained hop flowers and leaves between said grids, means for traversing said grids by the open side of said suction chest, means for separating the delivery ends of said grids outside of the zone of influence of said suction chest and means for separately collecting the hops and leaves from the two grids.

6. A pneumatic separating apparatus for separating hop flowers, hop petals and seeds from a mixture of these ingredients with hop leaves, comprising a suction chest, two grids spaced apart one above the other beneath the suction chest and having openings of such size as only to retain the larger parts of said mixture, means for continuously traversing said grids beneath said chest, which upper grid extends outside said chest, means for introducing the mixture between the grids, a sieve arranged beneath the upper grid outside the chest which sieve has openings of such size as to permit the passage through it of the petals and seeds but retains the leaves delivered from the upper grid.

7. A pneumatic separating apparatus for separating hop flowers, hop petals and seeds from a mixture of these ingredients with hop leaves, comprising a suction chest, two horizontally disposed perforated belt conveyors arranged one above the other with both stretches of both belts beneath and subjected to the influence of the suction chest, which lower belt is arranged to permit the passage through it of the petals and seeds, means for continuously traversing said belts beneath the suction chest so that the lower stretch of the upper belt and the upper stretch of the lower belt move in the same direction, which lower belt extends beyond one side of the suction chest at the inlet end thereof and which upper belt extends beyond the opposite side of the suction chest at the delivery end thereof, collecting means for the petals and seeds arranged between the two stretches of the lower belt outside the chest at the inlet end of the belt and means for separately collecting the leaves from the lower stretch of the upper belt outside the suction chest and the hop flowers from the upper stretch of the lower belt.

GEORGE ARTHUR HINDS.
FREDERIC WHIGHAM McCONNELL.